Aug. 2, 1932.  E. KNAPP ET AL  1,869,483
DUST GUN
Filed Dec. 2, 1927
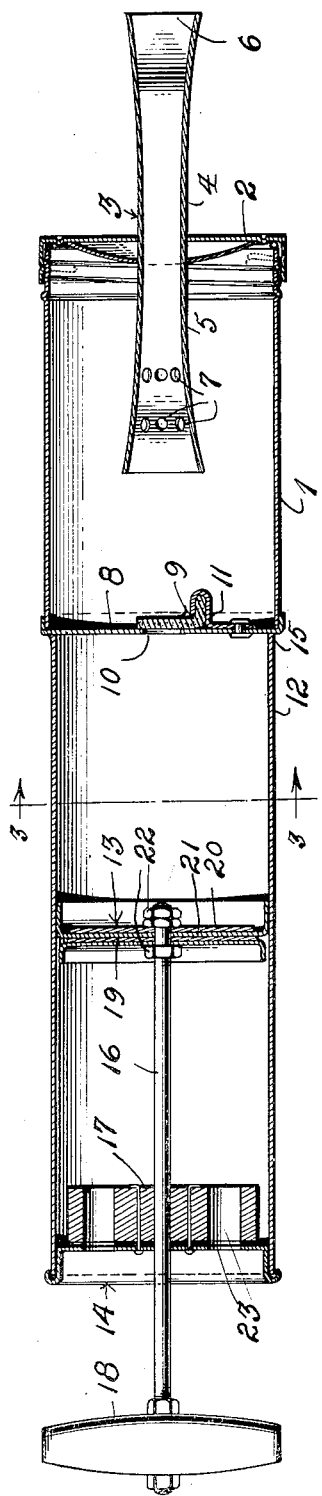
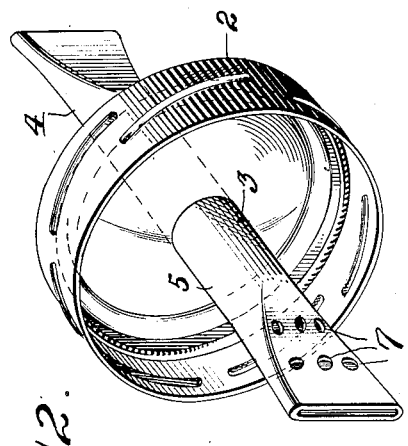
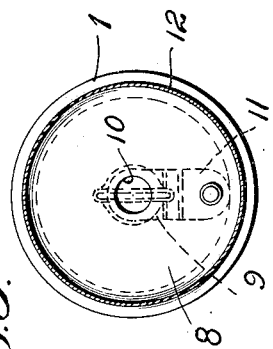
INVENTORS.
Edgar Knapp & Carl G. Allgrunn.
BY
A. S. McDaniel
THEIR ATTORNEY.

Patented Aug. 2, 1932

1,869,483

UNITED STATES PATENT OFFICE

EDGAR KNAPP AND CARL G. ALLGRUNN, OF MIDDLEPORT, NEW YORK, ASSIGNORS TO NIAGARA SPRAYER COMPANY, OF MIDDLEPORT, NEW YORK, A CORPORATION

DUST GUN

Application filed December 2, 1927. Serial No. 237,204.

The present invention relates to a device for the distribution of insecticides, fungicides and the like, and more particularly to the dusting of such materials upon vegetables for destroying the fungus growths and insects that exist thereon.

Insects and fungus growths have for a long time been the source of much destruction of vegetation, and such destruction naturally resulted in heavy losses to persons interested in agriculture. The spread of insects and fungus growths has persistently increased in spite of the fact that many insecticides and fungicides, some of which are quite effective, have been placed upon the market.

Insecticides and fungicides in powdered form have been found to have many advantages over insecticides and fungicides in liquid form, and although machines have been produced which are well adapted for distributing the powdered material, much difficulty has been encountered in the distribution of such material by means of hand operated dusting devices.

Quite a few hand operated devices for spraying insecticides of a liquid character have been devised, and in most instances these devices are operated on the atomizing principle, wherein a blast of air is passed over the upper end of a tube which has the lower end submerged in the insecticide, so that the suction created by the blast of air will draw the insecticide upwardly through the tube, whereupon it is atomized and discharged in the form of a mist. However, so far as I am aware, a simple easily constructed and efficient hand operated distributing device of light weight for powders has not heretofore been produced, and the usual atomizers for liquid insecticides are not efficient for this purpose.

An object contemplated by the present invention is the provision of a device for the distribution of insecticides or fungicides, particularly such materials in a powdered or finely divided condition, so that the material when discharged from the device will be in the form of a smoke or cloud, with the individual particles suspended in a blast of air. When the material is discharged in the smoke or cloud, it will be uniformly applied to all parts of the vegetation under treatment.

This invention further contemplates the provision of a container for the material to be distributed with means for forcing air or other suitable fluid into the container for agitating the same, together with means for causing a portion of the air to commingle with some of the material so agitated and to carry it to the outlet end of the device, whereupon it is distributed in the form of a smoke or cloud.

Other objects and advantages will be apparent from the following detailed description when considered in connection with the accompanying drawing, wherein;

Figure 1 is a longitudinal sectional view through a distributing device made in accordance with the present invention, Figure 2 is a perspective view of the cover for the material to be distributed, with the discharge nozzle mounted thereon, and Figure 3 is a view taken on line 3—3 of Figure 1.

Referring to the drawing in detail, the numeral 1 designates a container, in which the material to be distributed is placed, the container being closed at the filling end by means of a cover 2 in the form of a screw-threaded cap. This cover 2 has arranged centrally thereof a tube 3, which extends therefrom, both in a forwardly direction as at 4 and in a rearwardly direction as at 5. The forwardly extending portion 4 of the tube 3 is caused to be flared outwardly in one direction at its extreme end as a result of being compressed in a transverse direction, so that an elongated slotted discharge opening 6 is provided. The rearwardly extending portion 5 of the tube 3 is of a construction similar to the forward extending portion 4, and is provided with a plurality of openings 7, adjacent its end. The purpose of this construction will be hereinafter more fully described.

The container is provided with a rear wall 8, which has secured thereto at the inner side thereof a check valve 9 adapted to normally cover an opening 10 in the rear wall. This check valve 9 is preferably constructed from a piece of rubber or other suitable material which is securely anchored to the wall 8 at a point to one side of the opening 10, by means of a resilient metallic clamp 11, the check valve being adapted to open in a manner which will permit the passage of air into the container 1 from a cylinder 12 arranged at the rear of the container 1, but being arranged to close when there is a tendency for the passage of material into the cylinder from the container, such as would exist when a piston 13 contained in the cylinder is moved rearwardly.

The cylinder 12 which, as previously stated, is arranged at the rear of the container 1 is provided with a closure cap 14 at the end thereof. In the preferred form of construction this cylinder 12 is of a slightly smaller diameter than the container 1, so that its forward end 15 may be abutted against the surface of the rear wall 8 of the container 1 to provide close contacting surfaces so that the container and the cylinder can be securely joined at this point by means of solder or in any other suitable manner.

A piston rod 16 extends through the closure cap 14, and through a block 17 secured to the said cap, and the piston rod is connected at its forward end to the piston 13. The outer end of the piston rod 16 has mounted thereon a handle 18, by means of which the piston is adapted to be reciprocated within the cylinder 12. The block 17 is permanently attached to the closure cap 14 which due to the thickness thereof provides a guide means for the piston rod 16.

The piston 13 may be of the usual construction which is preferably in the form of metal disks 19 and 20, having clamped therebetween a washer 21 of leather or other suitable material, the washer being secured between the disks so that an annular rim thereof extends forwardly for sealing the space between the piston and cylinder when the piston is moved forwardly. The disks 19 and 20 and the washer 21 are securely held in position by means of the nuts 22 threaded on the piston rod 16.

The closure cap 14 and the block 17 are provided with registering openings 23 which permit the passage of air into the cylinder 12 as air is discharged during the reciprocation of the piston 13.

In distributing the powdered material with the present device, the cover 2 is removed from the container 1 and the container filled to a degree where the material is given some room for agitation therein, whereupon the cover 2 is securely screwed onto the container 1. The discharge opening 6 is then directed toward the vegetation or object to be dusted and the piston 13 reciprocated in the cylinder 12 by means of the handle 18. Now assuming that the piston is withdrawn to the rear end of the cylinder 12, then the handle 18 depressed so that the piston is driven to the forward end of the cylinder, the air or other fluid in the cylinder will cause the check valve to open, whereupon the air violently passes into the container 1. As the rearwardly extending portion 5 of the tube 3 is in direct alignment with the opening 10 in the rear wall 8 of the container 1, the air will be directed against the portion 5, and a part of the air will pass through the opening in the end thereof, while the remainder of the air will be deflected into the powdered material which will cause the same to be violently agitated.

The pressure which is placed upon the powdered material as it is being agitated, will cause some of the material to pass into the portion 5 through the openings 7, whereupon it will be commingled with the air rushing through the tube 3, and completely dispersed therein. The air and powder thus commingled in the tube 3 continues to pass through the tube until it reaches the discharge opening 6, whereupon it is discharged in the form of a cloud.

During the return stroke of the piston 13, the valve 9 is closed and the pressure maintained in the container 1 until it is relieved by passage of some of the material and air out through the tube 3, so that if the piston is reciprocated rapidly, the discharge of the material through the tube 3 will be at such a rate that at least some pressure is constantly maintained in the container 1, with the result that the discharge through the opening 6 will be more or less continuous.

Although the invention is shown as applied to a hand operated distributing device, it will be readily apparent that when large areas of vegetation are to be treated, the device may be built on a much larger scale and may be power operated if necessary, and it is therefore not intended that the invention be restricted to hand operated devices.

Likewise, while many advantages of the invention have been stated in so far as its use with insecticides and the like is concerned, it will be understood that the advantages derived from the invention will be present in many uses, wherein it is desired to obtain an even distribution of material, particularly is this so when the device is employed for distributing material while in a powdered or otherwise finely divided condition.

What we claim is:

1. In a device for distributing powder and the like, a pump chamber, a material chamber, valved communicating means between the chambers, said valved means permitting flow of fluid into the material chamber from the pump chamber and restricting flow in the opposite direction, a piston in the pump chamber, means arranged externally of the pump chamber for actuating the piston, a nozzle portion in the material chamber supported by and extending inwardly from a wall thereof, and a nozzle portion extending outwardly from said wall, said inwardly extending nozzle portion terminating short of the opposite wall of the material chamber and being provided with inlet means adjacent the extended end thereof and with additional inlet means in its side wall spaced from said first mentioned inlet means, the side wall of the inwardly extending nozzle portion being imperforated for a substantial distance between the inlet means at the end and the second mentioned additional inlet means.

2. In a device for distributing powder and the like, a pump chamber, a material chamber, valved communicating means between the chambers, said valved means permitting flow of fluid into the material chamber from the pump chamber and restricting flow in the opposite direction, a piston in the pump chamber, means arranged externally of the pump chamber for actuating the piston, a discharge nozzle passing through and secured to a wall of the material chamber having its ends extending inwardly and outwardly from said wall and the inner end thereof terminating short of the opposite wall of said chamber, said nozzle being provided with an inlet opening in the inner end thereof and with inlet openings arranged within the material chamber but longitudinally spaced from the inner extremity of said nozzle, the side wall of the said nozzle being imperforated for a substantial distance between the end opening and the second mentioned openings.

3. In a device for distributing powder and the like, a pump chamber, a material chamber, valved communicating means between the chambers, said valved means permitting flow of fluid into the material chamber from the pump chamber and restricting flow in an opposite direction, a piston in the pump chamber, means aranged externally of the pump chamber for actuating the piston, a filler cap for the material chamber, a nozzle portion in the pump chamber supported by and extending inwardly from the wall of the filler cap, a nozzle portion extending outwardly from said wall, said inwardly extending nozzle portion being provided with inlet means adjacent the inner end thereof and with additional inlet means longitudinally spaced from said first mentioned inlet means, the side wall of the said inwardly extending nozzle portion being imperforated for a substantial distance between the inlet means adjacent the end and said additional inlet means.

4. In a device for distributing powder and the like a pump chamber, a material chamber, valved communicating means between the chambers including an opening in a wall of the material chamber, said valved means permitting flow of fluid into the material chamber from the pump chamber and restricting flow in an opposite direction, a piston in the pump chamber, means arranged externally of the pump chamber for actuating the piston, a discharge nozzle passing through and secured to a wall of the material chamber with its ends extending inwardly and outwardly and with the inner end terminating short of the opposite wall of said chamber, said inner end of the nozzle and the opening of the valved communicating means being in alignment, and the nozzle being provided with an opening in said end thereof and with additional openings arranged within the material chamber but longitudinally spaced from said opening in said end.

5. In a device for distributing powder and the like, a pump chamber, a material chamber, valved communicating means between the chambers including an opening in a wall of the material chamber, said valved means permitting flow of fluid into the material chamber from the pump chamber and restricting flow in an opposite direction, a piston in the pump chamber, means arranged externally of the pump chamber for actuating the piston, a tube passing through and secured to a wall of the material chamber constituting a discharge nozzle and having its ends extending inwardly and outwardly from the wall, the inner end of the tube terminating short of the opposite wall of said chamber, and both ends of the tube being flattened to form wide flat openings, the wide flat opening in the inner end and the opening of the valved communicating means being in alignment, the nozzle being provided with inlet means arranged within the material chamber and longitudinally spaced from said opening in the inner end.

6. In a device for distributing powder and the like, a pump chamber, a material chamber, valved communicating means between the chambers, said valved means permitting flow of fluid into the material chamber from the pump chamber and restricting flow in an opposite direction, a piston in the pump chamber, means arranged externally of the pump chamber for actuating the piston, a discharge nozzle passing through and secured to a wall of the material chamber with its ends extending inwardly and outwardly therefrom, a tapering element secured to said wall about the nozzle and in turn secured to the nozzle at a point spaced from the wall so that the wall and element constitute the sole support for the nozzle, and said nozzle being provided with inlet means within the material chamber.

In testimony whereof we affix our signatures.

EDGAR KNAPP.
CARL G. ALLGRUNN.